US009151325B2

(12) United States Patent
Hanaka et al.

(10) Patent No.: US 9,151,325 B2
(45) Date of Patent: Oct. 6, 2015

(54) SELF-LUBRICATING SNUBBER BEARING (75) Inventors: Scott M. Hanaka, Wellsville, NY (US); Bruce E. Fuller, Alfred Station, NY (US); Joseph A. Tecza, Scio, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/110,299

(22) PCT Filed: Mar. 29, 2012

(86) PCT No.: PCT/US2012/031237
§ 371 (c)(1),
(2), (4) Date: Mar. 3, 2014

(87) PCT Pub. No.: WO2012/138544
PCT Pub. Date: Oct. 11, 2012

(65) Prior Publication Data
US 2014/0169711 A1    Jun. 19, 2014

Related U.S. Application Data

(60) Provisional application No. 61/473,458, filed on Apr. 8, 2011.

(51) Int. Cl.
*F16C 33/04* (2006.01)
*F16C 33/10* (2006.01)
(Continued)

(52) U.S. Cl.
CPC .............. *F16C 33/04* (2013.01); *F01D 25/162* (2013.01); *F16C 17/02* (2013.01); *F16C 17/10* (2013.01);
(Continued)

(58) Field of Classification Search
CPC .......... F16C 9/02; F16C 17/02; F16C 17/022; F16C 17/035; F16C 17/10; F16C 17/26; F16C 17/20; F16C 31/02; F16C 33/02; F16C 33/046; F16C 33/06; F16C 33/08; F16C 33/10; F16C 33/24; F16C 33/1095; F16C 35/02; F16C 35/10; F16C 2204/10; F16C 2226/34; F16C 2226/70; F16C 2226/72; F16C 2226/80; F16C 39/02; F16C 43/02; F16C 2202/52; F16D 25/162; Y10T 29/49647

USPC ................... 384/191.276, 282, 284–286, 293
See application file for complete search history.

(56) References Cited

U.S. PATENT DOCUMENTS

| | | | | | |
|---|---|---|---|---|---|
| 379,531 | A | * | 3/1888 | Douglas, Jr. .................. | 508/108 |
| 1,302,564 | A | * | 5/1919 | Klocke ..................... | 29/898.058 |

(Continued)

FOREIGN PATENT DOCUMENTS

| JP | 2004-340248 A | 12/2004 |
|---|---|---|
| KR | 10-2007-0106390 A | 11/2007 |

OTHER PUBLICATIONS

PCT/US2012/031237—International Search Report and Written Opinion mailed Nov. 1, 2012 (8 pages).
(Continued)

*Primary Examiner* — Alan B Waits
(74) *Attorney, Agent, or Firm* — Edmonds & Nolte, PC (57) ABSTRACT

Disclosed is a snubber bearing assembly for protecting a rotor and accompanying bearings from radial and axial rotor transient overload events. The bearing assembly includes a snubber journal mounted on the rotor and a snubber housing having a radial snubber bearing mounted on its inside surface, the radial snubber bearing being radially-offset from an outer radial surface of the snubber journal. Lubricating plugs are disposed within a plurality of holes defined in the radial snubber bearing, the lubricating plugs being configured to provide lubrication between the radial contact surface and the outer radial surface during a radial rotor transient overload event. The snubber housing can also include opposing axial snubber bearings that have lubricating plugs disposed within holes defined therein also. The opposing axial snubber bearings are configured to be axially-offset from inner axial surfaces defined by the rotor journal and provide lubrication therebetween during an axial rotor transient overload event.

14 Claims, 4 Drawing Sheets

(51) Int. Cl.
*F01D 25/16* (2006.01)
*F16C 39/02* (2006.01)
*F16C 17/02* (2006.01)
*F16C 17/10* (2006.01)
*F16C 43/02* (2006.01)

(52) U.S. Cl.
CPC ............. *F16C 33/1095* (2013.01); *F16C 39/02* (2013.01); *F16C 43/02* (2013.01); *F16C 2202/52* (2013.01); *Y10T 29/49647* (2015.01)

(56) References Cited

U.S. PATENT DOCUMENTS

| | | | | |
|---|---|---|---|---|
| 1,941,768 | A * | 1/1934 | Vigne | 384/282 |
| 4,538,928 | A * | 9/1985 | Muma | 384/96 |
| 4,693,617 | A * | 9/1987 | Roemer et al. | 384/282 |
| 4,896,368 | A * | 1/1990 | Just | 384/276 |
| 4,982,126 | A | 1/1991 | Jolivet et al. | |
| 5,192,136 | A * | 3/1993 | Thompson et al. | 384/123 |
| 5,272,403 | A | 12/1993 | New | |
| 5,546,394 | A | 8/1996 | Eaton et al. | |
| 5,549,394 | A * | 8/1996 | Nowak et al. | 384/282 |
| 5,664,890 | A * | 9/1997 | Nowak et al. | 384/282 |
| 5,693,994 | A | 12/1997 | New | |
| 6,095,690 | A * | 8/2000 | Niegel et al. | 384/293 |
| 6,987,339 | B2 | 1/2006 | Adams et al. | |
| 7,134,793 | B2 * | 11/2006 | Thompson et al. | 384/294 |
| 7,320,549 | B2 | 1/2008 | Kubota et al. | |
| 7,399,122 | B2 * | 7/2008 | Fujita et al. | 384/276 |
| 7,470,065 | B2 * | 12/2008 | Stadlmayr et al. | 384/285 |
| 7,930,947 | B2 | 4/2011 | Counts | |
| 8,851,756 | B2 | 10/2014 | Maier et al. | |
| 2003/0038553 | A1 * | 2/2003 | Andres et al. | 310/90.5 |
| 2004/0022653 | A1 * | 2/2004 | Brunet et al. | 417/423.5 |
| 2004/0189124 | A1 * | 9/2004 | Baudelocque et al. | 310/90.5 |
| 2005/0008271 | A1 | 1/2005 | Lee | |
| 2009/0302698 | A1 | 12/2009 | Menz et al. | |
| 2010/0054643 | A1 | 3/2010 | Serafini et al. | |

OTHER PUBLICATIONS

Atlas Bronze, "Copper Alloys, Iron Alloys," Brochure, 2 pages.
Atlas Bronze, "Graphite Lubricated Bearings," Website, 2 pages.
PCT/US2012/031237—International Preliminary Report on Patentability dated Oct. 8, 2013, 4 pages.

* cited by examiner

SELF-LUBRICATING SNUBBER BEARING

BACKGROUND

The present application is a national stage application of PCT Pat. App. No. PCT/US2012/031237, filed Mar. 29, 2012, which claims priority to U.S. Provisional Patent Application having Ser. No. 61/473,458, which was filed Apr. 8, 2011. These priority applications are incorporated by reference in their entirety into the present application, to the extent that it is these priority applications are not inconsistent with the present application.

Magnetic bearing systems are highly desirable in rotating machinery, especially turbomachinery, since they require no lubrication and have low friction losses. Magnetic bearings are, however, costly machine components and can be easily damaged during a shock event or any other type of transient overload event, characterized by large accelerations of the machine in radial and/or axial directions. Consequently, auxiliary bearings are required in most rotating machines and serve as a bumper to the rotor by preventing rotor impact with the magnetic bearings and thereby preventing severe damage. Auxiliary bearings, however, can only effectively absorb rotor thrusts and/or jolts to a limited degree of force before their use becomes inconsequential and the rotor nonetheless impacts the magnetic bearings.

To supplement the auxiliary bearings for severe rotor shock events, many rotating machines also employ "snubber" bearings. Snubber bearings serve essentially the same purpose as auxiliary bearings but are typically dissimilar in structure. Snubber bearings, for example, are typically offset radially and/or axially from the rotor and have at least one surface adapted to engage the rotor during radial or axial shock events (e.g., transient overload events). The purpose of the snubber is to protect the auxiliary and magnetic bearings during transient overload events which often create very large forces between casing and rotor and can result in the destruction of the auxiliary bearings and secondary damage to the magnetic bearings. Where the rotating machine is a compressor, surge is a typical transient overload event which can result in severe damage to any accompanying bearings if not mitigated by the use of a snubber bearing.

The snubber surface is often composed of a sacrificial metal or other material having a low coefficient of friction. Nonetheless, during a rotor transient overload event, the snubber surface can become severely galled and/or damaged. Moreover, the impact and duration of the transient overload event also causes the snubber bearing to heat up as contact between the snubber surface and the rotor generates a significant amount of friction. The heat generated from this contact causes thermal growth that reduces the operating life of the snubber bearing.

What is needed, therefore, is an improved snubber bearing and method of using the same in order to reduce friction and wear, limit heat generation, and prolong the operating life of the snubber bearing during rotor transient overload events.

SUMMARY

Embodiments of the disclosure may provide a bearing assembly. The bearing assembly may include a snubber housing having an annular inside surface and opposing axial ends, and a radial snubber bearing coupled to the inside surface of the snubber housing, the radial snubber bearing having one or more holes defined therein. The bearing assembly may further include lubricating plugs disposed within each of the one or more holes.

Embodiments of the disclosure may further provide a rotating machine. The rotating machine may include a rotor arranged within a casing, a snubber journal mounted on the rotor for rotation therewith and having an outer radial surface, and a snubber housing coupled to the casing and extending radially toward the snubber journal, the snubber housing having an inside surface and opposing axial ends. The rotating machine may further include a radial snubber bearing coupled to the inside surface of the snubber housing and having a radial contact surface radially-offset from the outer radial surface of the snubber journal. The rotating machine may also include lubricating plugs disposed within a plurality of holes defined in the radial snubber bearing, the lubricating plugs being configured to provide lubrication between the radial contact surface and the outer radial surface during a rotor transient overload event.

Embodiments of the disclosure may further provide a method for attenuating a rotor transient overload event. The method may include mounting a snubber journal on a rotor for rotation therewith, the rotor being disposed within a casing of a rotating machine and the snubber journal having an outer radial surface, and resisting radial movement of the rotor with a radial snubber bearing coupled to the casing, the radial snubber bearing having a radial contact surface radially-offset from the outer radial surface of the snubber journal. The method may further include lubricating the radial contact surface and the outer radial surface of the rotor with lubricating plugs disposed within a plurality of holes defined in the radial snubber bearing.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
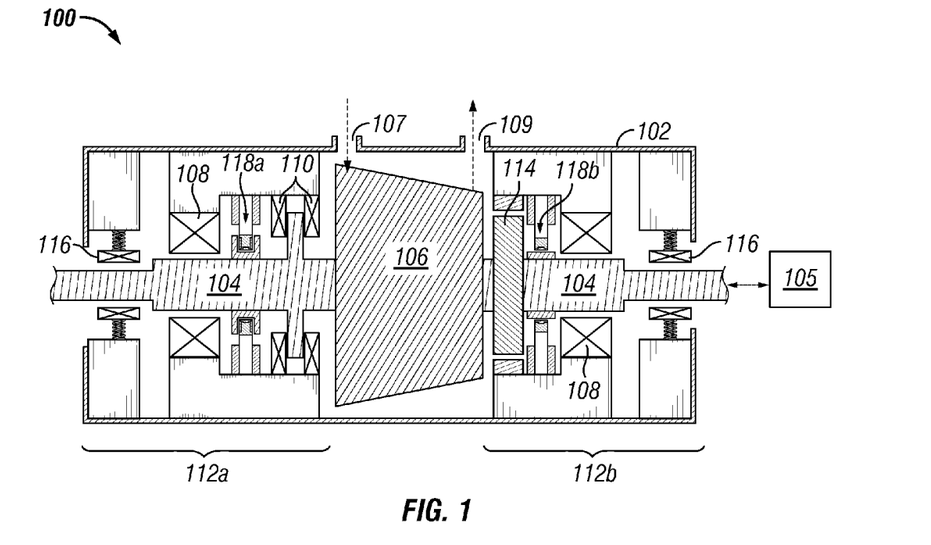
FIG. 1 illustrates a cross-sectional side view of a rotating machine, according to one or more embodiments disclosed.

FIG. 1 illustrates a cross-section of an exemplary rotating machine 100, such as a turbomachine, that employs one or more exemplary snubber bearing assemblies 118a and 118b according to embodiments disclosed herein. As illustrated, the rotating machine 100 may be a centrifugal compressor, but it will be appreciated that any type of rotating machine, such as a steam turbine, gas turbine, expander, motor, or generator may be used without departing from the scope of the disclosure. The rotating machine 100 may include a housing or casing 102 having a rotor 104 that extends substantially the whole length of the casing 102.

The rotor 104 may have a non-thrust end 112a and a thrust-end 112b. In at least one embodiment, the non-thrust end 112b of the rotor 104 extends outside of the casing 102 and is coupled to a motor 105 configured to drive the rotor 104 for rotation about its axis. The motor 105 may be an electric motor, such as a permanent magnet motor, but may also include other types of electric motors such as, but not limited to, synchronous, induction, brushed DC motors, etc. In embodiments where the rotating machine 100 is a steam turbine or expander, the motor 105 may be a generator 105 adapted to generate power.

A compressor 106 may be arranged or otherwise positioned within the casing 102 and mounted on the rotor 104 for rotation therewith. In other embodiments, the compressor 106 may be a steam turbine 106, expander, or the like, without departing from the scope of the disclosure. In one embodiment, the compressor 106 may be a multi-stage centrifugal compressor having one or more compressor stage impellers (not shown) configured to compress an incoming process gas. The process gas may include, but is not limited to, a mixture of hydrocarbon gas, such as natural gas or methane derived from a hydrocarbon production field or via a pressurized pipeline. In other embodiments, the process gas may include air, $CO_2$, $N_2$, ethane, propane, $i-C_4$, $n-C_4$, $i-C_5$, $n-C_5$, and/or combinations thereof. The process gas is introduced into the compressor 106 via an inlet 107 defined in the casing 102. Compressed process gas is ultimately discharged from the compressor 106 via a process discharge 109 defined in the casing 102.

The rotor 104 may be supported at or near each end 112a, 112b by one or more radial bearings 108. The radial bearings 108 may be directly or indirectly supported by the casing 102, and in turn provide support to the rotor 104 which carries the compressor 106 during operation. In one embodiment, the bearings 108 may be magnetic bearings, such as active or passive magnetic bearings. In other embodiments, however, other types of bearings 108 may be used. In addition, at least one axial thrust bearing 110 may be arranged on the thrust end 112a of the casing 102. The axial thrust bearing 110 may be a magnetic bearing and configured to bear axial thrusts generated by the compressor 106.

A balance piston 114 may also be arranged on the rotor 104 on the non-thrust end 112b. Due to the pressure rise developed through the compressor 106, a pressure difference is created such that the compressor 106 has a net thrust in the direction of the inlet 107. The balance piston 114 serves to counteract that force, and any compressor 106 thrust not absorbed by the balance piston 114 may be otherwise absorbed by the thrust bearing(s) 110. In embodiments where the rotating machine 100 is a steam turbine or expander, the balance piston 114 may be omitted, or used only if necessary.

Auxiliary bearings 116 may be arranged at each end of the rotor 104 and supported directly or indirectly by the casing 102. The auxiliary bearings 116 may be configured to generally prevent the rotor 104 from impacting the radial bearings 108 during a radial or axial transient overload event, or in the event that the radial bearings 108 fail during operation.

Damage to the radial bearings 108 may also be minimized or otherwise entirely prevented by employing the first and second snubber bearing assemblies 118a and 118b arranged circumferentially about the rotor 104 on the thrust end 112a and the non-thrust end 112b, respectively. The first snubber bearing assembly 118a may be coupled to or otherwise supported by the casing 102 and axially-arranged between the axial thrust bearing 110 and the radial bearing 108 of the thrust end 112a. The second snubber bearing assembly 118b may also be coupled to or otherwise supported by the casing 102 but axially-arranged between the balance piston 114 and the radial bearing 108 provided on the non-thrust end 112b. It will be appreciated, however, that the general arrangement and axial location of each snubber bearing assembly 118a,b along the rotor 104 may be modified to fit varying applications.

For example, in a back-to-back compressor (not shown), a snubber bearing assembly could be integrated into the seal structure at the division wall. Also, in applications where a concern exists regarding response of a flexible coupling at the end of rotatable shaft, a snubber bearing assembly may be employed there also to mitigate potential radial accelerations that would otherwise damage the coupling or any adjacent bearings.

Figure 2A:
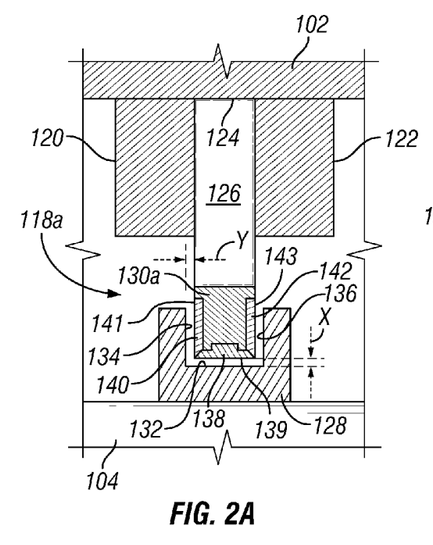
FIG. 2A illustrates a cross-sectional, close-up view of an exemplary snubber bearing assembly shown in FIG. 1, according to one or more embodiments disclosed.

Referring now to FIG. 2A, illustrated is a cross-sectional, close-up view of the first snubber bearing assembly 118a as shown in FIG. 1. For the sake of clarity and brevity, only the upper portion of the first snubber bearing assembly 118a is depicted, but it will be appreciated that the lower portion of the first snubber bearing assembly 118a would be substantially identical. As illustrated, the first snubber bearing assembly 118a may include a snubber housing 130a coupled or otherwise attached to the casing 102 via a snubber mount 126. In one embodiment, the snubber housing 130a is mechanically fastened to the snubber mount 126 using, for example, bolts or other similar fastening devices. In other embodiments, however, the snubber housing 130a may be welded or brazed to the snubber mount 126. In yet other embodiments, the snubber mount 126 is entirely omitted and the snubber housing 130a may extend radially to the casing 102 to be coupled directly thereto.

The snubber mount 126 extends radially from the casing 102 toward the rotor 104. The casing 102 may define a pair of opposing shoulders 120 and 122 that provide a channel 124 adapted to seat the snubber mount 126. The snubber mount 126 may be coupled or otherwise fastened to the shoulders 120, 122 as a non-rotating insert to prevent removal therefrom. In one embodiment, the snubber mount 126 is mechanically fastened to the shoulders 120, 122, but in other embodiments, the snubber mount is welded or brazed to the shoulders 120, 122.

A snubber journal 128 may be mounted to the rotor 104 for rotation therewith. In one embodiment, the snubber journal 128 may be a u-shaped trough, as illustrated, and be configured to receive at least a portion of the snubber housing 130a therein. The snubber journal 128 may be shrink-fitted onto the rotor 104. In other embodiments, however, the snubber journal 128 may be welded or brazed to the rotor 104. In yet other embodiments, the snubber journal 128 may be machined as an integral part of the rotor 104 or mechanically-fastened thereto with, for example, bolts or other similar fasteners. The snubber journal 128 may include an outer radial surface 132 and opposing, inner axial surfaces 134 and 136, respectively. In at least one embodiment, the snubber journal 128 may be made of stainless steel such as, but not limited to, NITRONIC® stainless steels.

The first snubber bearing assembly 118a may also include one or more snubber bearings, such as a radial snubber bearing 138 and opposing axial snubber bearings 140 and 142. Each snubber bearing 138, 140, 142 may be coupled or otherwise attached to the snubber housing 130a at the inside surface of the housing 130a. For example, the snubber bearings 138, 140, 142 may be mechanically-fastened to the snubber housing 130a using, for example, bolts or other similar fastening devices, but they may also be brazed to the snubber housing 130a without departing from the scope of the disclosure.

Each snubber bearing 138, 140, 142 may be made from a material having a low-coefficient of friction, such as a material that exhibits high strength and resistance to galling and wear. For example, the coefficient of friction may range from about 0.1 to about 0.3. In at least one embodiment, the snubber bearings 138, 140, 142 may be made of spinodal copper, such as commercially-available TOUGHMET® spinodal copper. In other embodiments, however, the snubber bearings 138, 140, 142 may be made of a copper-beryllium alloy or any other copper alloy that exhibits a low-coefficient of friction and is wear-compatible with the journal 128 material.

The snubber bearings 138, 140, 142 are either axially or radially-offset from a corresponding outer radial surface 132 of the snubber journal 128. For example, the radial snubber bearing 138 has a radial contact surface 139 that is radially-offset from the outer radial surface 132 of the snubber journal 128 by a distance X. During a radial transient overload event which forces the rotor 104 in a general radial direction the distance X or greater, the radial contact surface 139 may be configured to come into contact or otherwise impact the outer radial surface 132 of the snubber journal 128.

Moreover, the axial snubber bearings 140 and 142 may have corresponding axial contact surfaces 141 and 143, respectively, that are axially-offset from opposing inner axial surfaces 134 and 136 of the snubber journal 128, respectively, by a distance Y. During an axial transient overload event, which forces the rotor 104 in a general axial direction the distance Y or greater, either or both of the axial contact surfaces 139, 141 may be configured to come into contact or otherwise impact the inner axial surfaces 134, 136 of the snubber journal 128, respectively. In other embodiments, especially in applications where axial transient overload events occur almost exclusively in one axial direction, only one axial snubber bearing 140, 142 may be employed.

During normal operation, the radial and axial offset distances X and Y may be about 20 mils (i.e., thousandths of an inch), while the distance between the outside surface of the rotor 104 and the inside surface of each radial and axial thrust bearing 108, 110 (FIG. 1) may be about 30 mils. Consequently, the snubber bearings 138, 140, 142 may be adapted to stop or resist the radial and axial advances of the rotor 104 before the rotor 104 impacts either the radial bearings 108 or the axial thrust bearing 110. It will be appreciated, however, that the offset distances X and Y may be increased or decreased to fit varying applications.

Figure 2B:
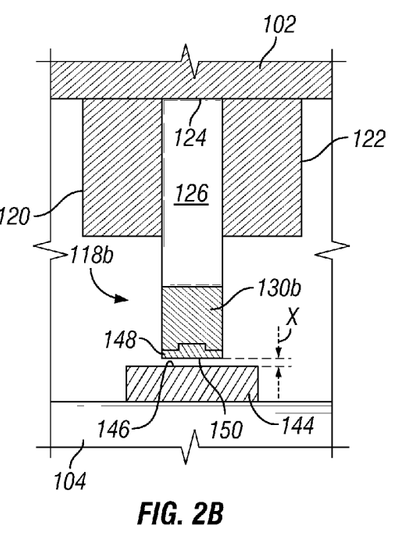
FIG. 2B illustrates a cross-sectional, close-up view of another exemplary snubber bearing assembly shown in FIG. 1, according to one or more embodiments disclosed.

Referring now to FIG. 2B, illustrated is a cross-sectional, close-up view of the second snubber bearing assembly 118b, as generally shown in FIG. 1. The first and second snubber bearing assemblies 118a,b may be substantially similar in several respects. Accordingly, the second snubber bearing assembly 118b may be best understood with reference to the first snubber bearing assembly 118a of FIG. 2A, where like numerals indicate like elements and therefore will not be described again in detail. The second snubber bearing assembly 118b may also include a snubber housing 130b coupled to the casing 102 via a snubber mount 126 that extends radially from the casing 102 toward the rotor 104. In other embodiments, however, the snubber housing 130b may extend radially to the casing 102 and be coupled thereto, thereby omitting the snubber mount 126 entirely.

A snubber journal 144 may be mounted to the rotor 104 for rotation therewith. As with the snubber journal 128 in FIG. 2A, the snubber journal 144 may be shrink-fitted onto the rotor 104, but may also be welded or brazed to the rotor 104. In other embodiments, the snubber journal 144 may be machined as an integral part of the rotor 104 or mechanically-fastened to the rotor 104 with, for example, bolts or similar mechanical fasteners.

The second snubber bearing assembly 118b may also include a radial snubber bearing 148 coupled or otherwise attached to the inside surface of the snubber housing 130b using mechanical fasteners or by brazing. As with the snubber bearings 138, 140, 142 described above, the snubber bearing 148 may be made of a material having a low-coefficient of friction, such as spinodal copper, a copper-beryllium alloy, or any other alloy having a low-coefficient of friction and is wear-compatible with the journal 144 material. The radial snubber bearing 148 has a radial contact surface 150 that may be radially-offset a distance X from an outer radial surface 146 of the snubber journal 144. During a radial transient overload event, the radial contact surface 150 may be configured to come into contact with the outer radial surface 146 of the snubber journal 144. Contact between the two surfaces 146, 150 stops radial advancement of the rotor 104 before the rotor 104 comes into contact with the radial bearings 108 (FIG. 1) and causes any damage thereto.

Figure 3A:
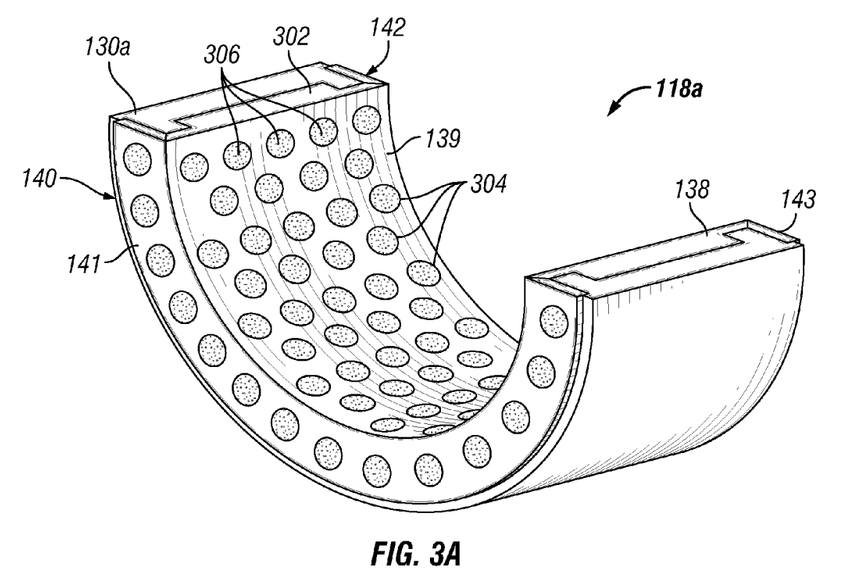
FIG. 3A illustrates a perspective view of an arcuate segment of the snubber bearing assembly shown in FIG. 2A, according to one or more embodiments disclosed.

Referring now to FIG. 3A, illustrated is a perspective view of an arcuate segment of the first snubber bearing assembly 118a, as generally described above with reference to FIG. 2A. As will be appreciated, both snubber bearing assemblies 118a,b described above may be split into two arcuate halves that are fitted into the casing 102 to form a complete annulus. In other embodiments, each snubber bearing assembly 118a,b may be manufactured as a one-piece annulus that may be extended over the end of the rotor 104 (FIG. 1) and properly located and positioned within the casing 102 (FIG. 1). In yet other embodiments the snubber bearing assemblies 118a,b may be split into more than two arcuate sections that are fitted into the casing 102 to form a complete annulus As illustrated, the radial snubber bearing 138 may include a radial extent 302 that extends radially into the snubber housing 130a. The cross-section of the radial extent 302 may be generally rectangular, as illustrated, and extend circumferentially about the radial snubber bearing 138. In other embodiments, however, the radial extent 302 may be shaped differently such as, but not limited to, a dove-tail shape, t-shaped, or any other suitable polygonal or arcuate shape.

Each snubber bearing 138, 140, 142 may have a plurality of holes 304 defined therein, and each hole 304 may house or otherwise seat a lubricating plug 306. In other embodiments, however, the holes 304 and lubricating plugs 306 may be included only in the radial snubber bearing 138, or only in one or both of the axial snubber bearings 140, 142, or combinations thereof. The lubricating plugs 306 may be lubricious inserts configured to provide or otherwise convey a lubricant each time the rotor 104 makes contact with the snubber bearings 138, 140, 142. In one embodiment, the lubricating plugs 306 may be made of graphite or a graphite alloy, such as commercially-available GRAPHALLOY®. As will be appreciated, however, any similarly lubricious material or substance may be used without departing from the scope of the disclosure.

In operation, the lubricating plugs 306 disposed within the holes 304 of the radial snubber bearing 138 may be configured to simultaneously lubricate the inner surface 139 of the radial snubber bearing 138 and the outer radial surface 132 of the snubber journal 128 (FIG. 2A) when contact between the two surfaces 139, 132 is made. As the inner surface 139 wears, layers of the plugs 304 shear off and provide a constant supply of lubrication. Likewise, the lubricating plugs 306 disposed within the holes 304 of the axial snubber bearings 140, 142 may be configured to simultaneously lubricate the inner axial surfaces 141, 143 and the opposing inner axial surfaces 134, 136 of the journal 128 (FIG. 2A), respectively, when contact between the corresponding surfaces (i.e., surfaces 141 and 134, and surfaces 143 and 136) is made.

The addition of the lubricating plugs 306 in the snubber bearings 138, 140, 142 provides added and continuous lubrication during a transient overload event, without which galling of the contact surfaces 139, 141, 143 and/or premature seizure of the rotor 104 may result. The added lubrication reduces wear on the snubber bearings 138, 140, 142 and also reduces friction heat that would otherwise result in thermal growth of the first snubber bearing assembly 118a and/or the snubber journal 128 (FIG. 2A). Consequently, the lubricating plugs 306 increase the lifespan of the snubber bearings 138, 140, 142. Moreover, the addition of the lubricating plugs 306 eliminates the need to use a lubricating film or fluid, which can contaminate and/or damage adjacent magnetic bearings, such as the radial bearings 108 or axial thrust bearing 110 (FIG. 1).

Figure 3B:
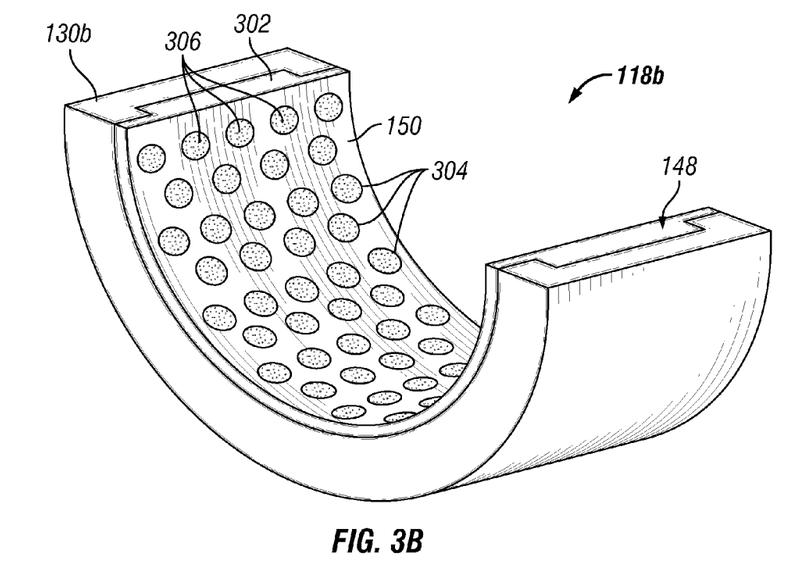
FIG. 3B illustrates a perspective view of an arcuate segment of the snubber bearing assembly shown in FIG. 2B, according to one or more embodiments disclosed.

Referring now to FIG. 3B, illustrated is a perspective view of an arcuate segment of the second snubber bearing assembly 118b, as generally described above with reference to FIG. 2B. FIG. 3B may be best understood with reference to FIG. 3A, where like numerals indicate like elements and therefore will not be described again in detail. Similar to the radial snubber bearing 138 of FIG. 3A, the radial snubber bearing 148 of FIG. 3B may also define a plurality of holes 304 that house or otherwise seat a corresponding plurality of lubricating plugs 306. During a transient overload event, the lubricating plugs 306 simultaneously provide lubrication to the inner radial surface 150 of the radial snubber bearing 148 and the outer radial surface 146 of the snubber journal 144 (FIG. 2B). It will be appreciated that the same advantages gained by implementing the lubricating plugs 306 on the first bearing assembly 118a of FIG. 3A may equally be had by using the lubricating plugs 306 on the second bearing assembly 118b shown in FIG. 3B.

Figure 4:
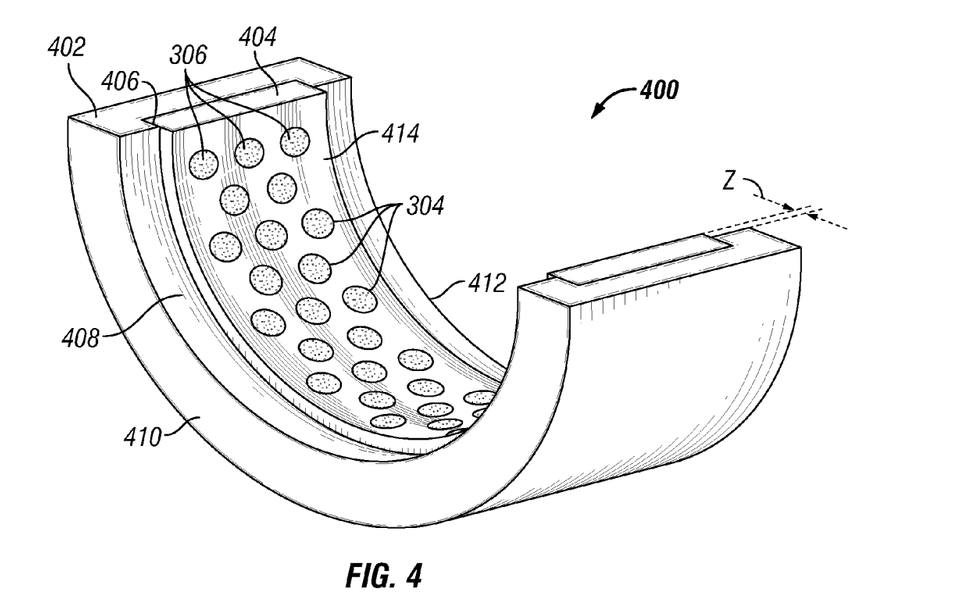
FIG. 4 illustrates a perspective view of an arcuate segment of another snubber bearing assembly, according to one or more embodiments disclosed.

Referring now to FIG. 4, illustrated is a perspective view of an arcuate segment of another snubber bearing assembly 400, according to one or more embodiments disclosed. The snubber bearing assembly 400 may be substantially similar to the snubber bearing assemblies 118a and 118b described above with reference to FIGS. 2A, 2B, 3A, and 3B. Accordingly, the snubber bearing assembly 400 may be best understood with reference to FIGS. 2A, 2B, 3A, and 3B, where like numerals indicate like elements that will not be described again in detail.

The snubber bearing assembly 400 may include a snubber housing 402 and a radial snubber bearing 404 seated within a groove 406 defined in the snubber housing 402. The radial snubber bearing 404 extends radially-outward past an inside surface 408 of the snubber housing 402. As illustrated, the radial snubber bearing 404 may extend a distance Z past the inside surface 408 of the snubber housing 402, and it will be appreciated that the distance Z may be increased or decreased to fit differing applications. The snubber housing 402 also provides opposing axial ends 410 and 412. In one or more embodiments, the opposing axial ends 410, 412 may accommodate or otherwise receive opposing axial snubber bearings (not shown) substantially similar to the axial snubber bearings 140 and 142 as generally described above with reference to FIGS. 2A and 3A.

As with prior embodiments, the radial snubber bearing 404 may define a plurality of holes 304 having a corresponding plurality of lubricating plugs 306 housed or otherwise seated therein. During a transient overload event which causes contact between a radial contact surface 414 of the radial snubber bearing 404 and either the outer radial surface of a trough (e.g., the snubber journal 128 of FIG. 2A) or the outer radial surface of a snubber journal (e.g., the snubber journal 144 of FIG. 2B), the lubricating plugs 306 provide lubrication between the contacting surfaces. The smaller size of the radial snubber bearing 404 may prove advantageous in reducing the cost and weight of the snubber housing 402, while at the same time providing a suitable protection for the radial and axial bearings 108, 110.

Figure 5:
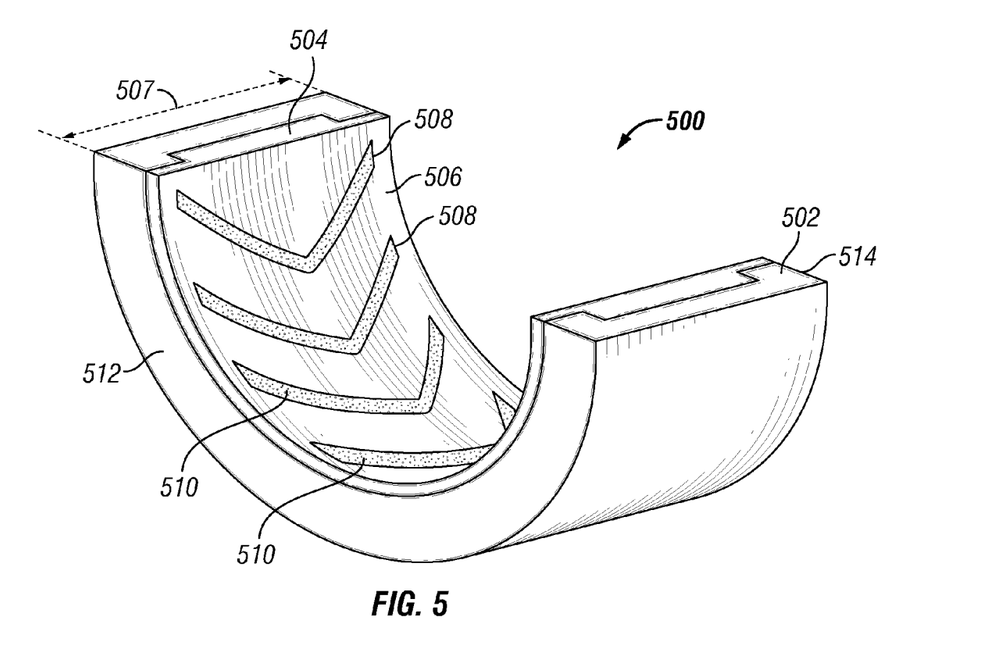
FIG. 5 illustrates a perspective view of an arcuate segment of another snubber bearing assembly, according to one or more embodiments disclosed.

Referring now to FIG. 5, illustrated is a perspective view of an arcuate segment of another exemplary snubber bearing assembly 500, according to one or more embodiments disclosed. The snubber bearing assembly 500 may also be substantially similar to the snubber bearing assemblies 118a and 118b described above with reference to FIGS. 2A, 2B, 3A, and 3B. Accordingly, the snubber bearing assembly 500 may be best understood with reference to FIGS. 2A, 2B, 3A, and 3B, where like numerals indicate like elements that will not be described again in detail.

The snubber bearing assembly 500 may include a snubber housing 502 that seats or otherwise is coupled to a radial snubber bearing 504 having a radial contact surface 506. The radial contact surface 506 may defines a plurality of grooves 508 therein. As illustrated, each groove 508 may be in the general form of a "v" that spans the majority of the axial length 507 of the radial contact surface 506. In other embodiments, however, the grooves 508 may be formed in different shapes and/or sizes, without departing from the scope of the disclosure. For example, in one embodiment, the grooves 508 may span only a portion of the axial length and not the majority thereof. Moreover, it is also contemplated herein to have oblique, parallel grooves 508 that extend linearly across the majority of the axial length 507 of the radial contact surface 506.

Each groove 508 may house or otherwise seat a corresponding plug 510 which serves substantially the same purpose as the lubricating plugs 306 generally described above with reference to FIGS. 3A, 3B, and 4. Accordingly, each plug 510 may be made of graphite or a graphite alloy configured to provide or otherwise convey a lubricant each time the rotor 104 (FIG. 1) makes contact with the radial contact surface 506 of the snubber bearing 502. Moreover, it will be appreciated that the grooves 508 may be equally applied to other snubber embodiments, such as the snubber bearing assembly 400 of FIG. 4.

As with the opposing axial ends 410 and 412 described above with respect to FIG. 4, opposing axial ends 512 and 514 in FIG. 5 may accommodate or otherwise receive opposing axial snubber bearings (not shown) that are substantially similar to the axial snubber bearings 140 and 142 as generally described above with reference to FIG. 3A. Consequently, in at least one embodiment, the snubber bearing assembly 500 may also provide axial lubrication at its axial ends 512, 514 in order to protect the axial thrust bearing 110 (FIG. 1) during axial transient overload events.

Figure 6A:
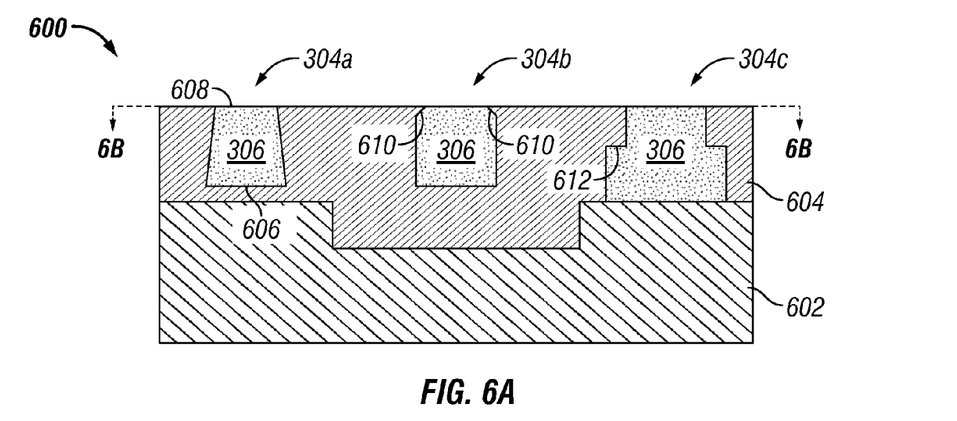
FIG. 6A illustrates a cross-sectional side view of a snubber bearing assembly, according to one or more embodiments disclosed.
Figure 6B:
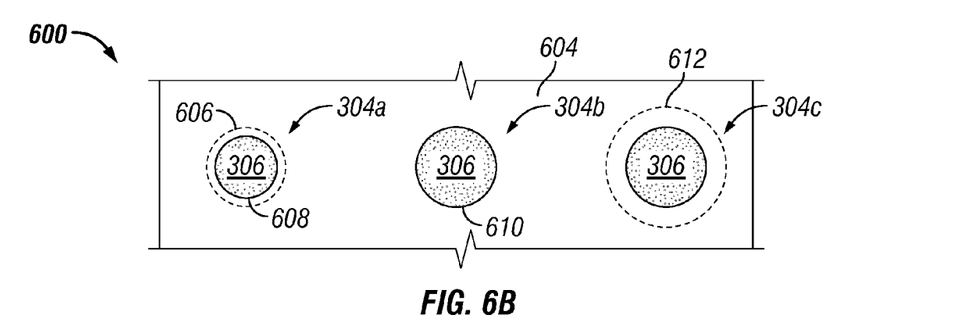
FIG. 6B illustrates a top view of the snubber bearing assembly of FIG. 6A.

Referring now to FIGS. 6A and 6B, illustrated are cross-sectional side (FIG. 6A) and top (FIG. 6B) views of a snubber bearing assembly 600. FIG. 6B is taken along the line indicated in FIG. 6A. The snubber bearing assembly 600 may be generally representative of snubber bearing assemblies 118a, 118b, 400, and 500, as described herein. Accordingly, reference should be made to the descriptions provided above for the snubber bearing assemblies 118a, 118b, 400, and 500 to better understand the general characteristics of the snubber bearing assembly 600.

As illustrated, the snubber bearing assembly 600 includes a snubber housing 602 coupled or otherwise attached to a snubber bearing 604. The snubber bearing 604 defines a plurality of holes 304, such as holes 304a, 304b, and 304c. Each hole 304a,b,c may be configured to house or otherwise seat a corresponding lubricating plug 306, such as the lubricating plugs 306 described above with reference to FIGS. 3A, 3B, and 4. Moreover, each hole 304a,b,c provides a different shape and/or configuration adapted to retain the lubricating plug 306 within the corresponding hole 304a,b,c during operation. For example, the first hole 304a may provide a generally trapezoidal or dove-tail cross-section, where the radius at the bottom 606 is greater than the radius at the top 608 of the first hole 304a. The second hole 304b may provide a generally cylindrical cross-section, but may trap or otherwise hold the lubricating plug 306 inside the second hole 304b by bending over (i.e., peening) an annular rim 610 of the second hole 304b. The third hole 304c may be configured to extend the entire depth of the snubber bearing 604 and define an annular shoulder 612 at an intermediate point therein. The annular shoulder 612 and the biasing engagement with the snubber bearing 602 at the bottom of the hole 304c jointly retain the lubricating plug 306 within the hole 304c.

The lubricating plugs 306 may be seated or otherwise received within each hole 304a,b,c via a variety of processes. For example, the lubricating plugs 306 may be pressed into the holes 304a,b,c at their openings or, as in the case with the third hole 304c, the lubricating plugs 306 may be pressed in from both the top and bottom openings. In another embodiment, the snubber bearing 604 may be heated to expand the opening of each hole 304a,b,c and after the lubricating plug 306 is properly seated therein, the snubber bearing 604 may be cooled to provide a shrink fit engagement between the lubricating plug 306 and respective hole 304a,b,c.

While only three different shapes and/or configurations of holes 304 are shown in FIGS. 6A and 6B, it will be appreciated that several other shapes and/or configurations may be employed without departing from the scope of the disclosure. For example, in at least one embodiment, the hole 304 may be a straight cylinder. Moreover, it should be noted that the grooves 508 described above with reference to FIG. 5 may also be defined with similar or identical cross-sections in order to retain the plugs 510 therein during operation. Also, the different shapes and/or configurations of the holes 304 may be equally applicable to the holes 304 defined in the axial snubber bearings 140 and 142, as generally described above with reference to FIG. 3A.

Figure 7:
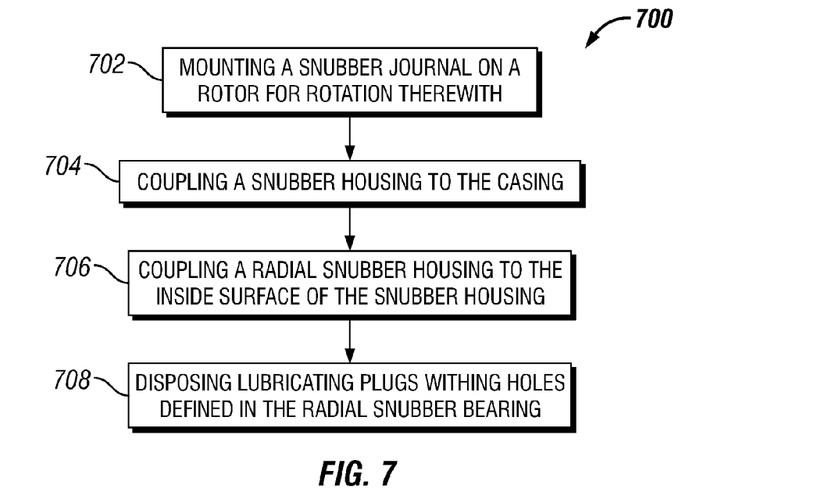
FIG. 7 illustrates a schematic flowchart of a method for attenuating a rotor transient overload event, according to one or more embodiments disclosed.

Referring now to FIG. 7, illustrated is a flowchart of a method 700 for attenuating a rotor transient overload event, according to one or more embodiments disclosed herein. The method 700 may include mounting a snubber journal on a rotor for rotation therewith, as at 702. As generally described above, the rotor may be disposed within the casing of a rotating machine, and the snubber journal may have an outer radial surface. A snubber housing may be coupled to the casing, as at 704. The snubber housing may extend radially toward the snubber journal and have an inside surface and opposing axial ends.

The method 700 may further include coupling a radial snubber bearing to the inside surface of the snubber housing, as at 706. The radial snubber bearing may include a radial contact surface that is radially-offset from the outer radial surface of the snubber journal and configured to resist the radial advances of the rotor during a radial rotor transient overload event. Lubricating plugs may be disposed within a plurality of holes defined in the radial snubber bearing, as at 708. In one embodiment, the lubricating plugs are configured to provide lubrication between the radial contact surface and the outer radial surface during the radial rotor transient overload event.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A rotating machine, comprising:
   a rotor arranged within a casing;
   a plurality of radial magnetic bearings supported by the casing and configured to support the rotor;
   a plurality of auxiliary bearings supported by the casing and configured to prevent the rotor from contacting respective inner radial surfaces of the plurality of radial magnetic bearings of the rotating machine;
   a plurality of snubber bearing assemblies, each snubber bearing assembly of the plurality of snubber bearing assemblies comprising:
      a snubber journal mounted on the rotor for rotation therewith and having an outer radial surface;
      a snubber housing coupled to the casing via a snubber mount, the snubber housing extending radially toward the snubber journal and having an inside surface and opposing axial ends; and
      a radial snubber bearing coupled to the inside surface of the snubber housing and having a radial contact surface radially-offset from the outer radial surface of the snubber journal, the radial snubber bearing defining a plurality of holes; and
   a first plurality of lubricating plugs, at least one lubricating plug of the first plurality of lubricating plugs is disposed within a respective hole of the plurality of holes of the radial snubber bearing, the first plurality of lubricating plugs being configured to provide lubrication between the radial contact surface and the outer radial surface during a rotor transient overload event.

2. The rotating machine of claim 1, wherein the snubber journal includes a u-shaped trough having opposing inner axial surfaces.

3. The rotating machine of claim 2, further comprising opposing axial snubber bearings coupled to the opposing axial ends of the snubber housing, the opposing axial snubber bearings having axial contact surfaces that are axially-offset from the opposing inner axial surfaces of the snubber journal, respectively.

4. The rotating machine of claim 3, wherein each of the opposing axial snubber bearings defines a plurality of holes therein, and at least one lubricating plug of a second plurality of lubricating plugs is disposed in a respective hole of the plurality of holes of each of the opposing axial snubber bearings, the at least one lubricating plug of the second plurality of lubricating plugs being configured to provide lubrication between the axial contact surfaces and the opposing inner axial surfaces during an axial rotor transient overload event.

5. The rotating machine of claim 4, wherein the first plurality of lubricating plugs and the second plurality of lubricating plugs comprise a graphite material.

6. The rotating machine of claim 4, wherein the radial snubber bearing and the opposing axial snubber bearings are made from a material having a coefficient of friction from about 0.1 to about 0.3.

7. The rotating machine of claim 6, wherein the material is spinodal copper.

8. The rotating machine of claim 1, wherein
   at least one snubber bearing assembly of the plurality of snubber bearing assemblies is disposed axially between at least one of the radial magnetic bearings and an axial thrust bearing of the rotating machine.

9. The rotating machine of claim 1, wherein
   at least one snubber bearing assembly of the plurality of snubber bearing assemblies is disposed axially between at least one of the radial magnetic bearings and a balance piston of the rotating machine.

10. The rotating machine of claim 1, wherein
    a radial extent of at least one of the radial snubber bearings at least partially extends into the respective snubber housing to couple the at least one radial snubber bearing to the snubber housing.

11. The rotating machine of claim 1, further comprising:
    wherein
    a t-shaped radial extent of at least one the radial snubber bearing at least partially extends into the respective snubber housing to couple the at least one radial snubber bearing to the snubber housing.

12. The rotating machine of claim 1 wherein
    a dove-tail shaped radial extent of the radial snubber bearing at least partially extends into the snubber housing to couple the radial snubber bearing to the snubber housing.

13. A method for attenuating a rotor transient overload event in a rotating machine having a rotor, comprising:
    mounting a plurality of snubber bearing assemblies in the rotating machine, each snubber bearing assembly of the plurality of snubber bearing assemblies comprising a snubber journal mounted on the rotor of the rotating machine, a snubber housing coupled with a casing of the rotating machine, and a radial snubber bearing coupled to the casing, wherein mounting the plurality of snubber bearing assemblies comprises:
        mounting the respective snubber journal of each of the plurality of snubber bearing assemblies on the rotor for rotation therewith, the rotor being disposed within the casing of the rotating machine, and the respective snubber journal of each of the plurality of snubber bearing assemblies is a u-shaped trough having an outer radial surface and opposing inner axial surfaces;
    resisting axial movement of the rotor with opposing axial snubber bearings coupled to respective opposing axial ends of each snubber housing coupled with the casing, the opposing axial snubber bearings having respective axial contact surfaces that are axially-offset from the respective opposing inner axial surfaces of the snubber journal;
    resisting radial movement of the rotor with each radial snubber bearing coupled to the casing, the radial snubber bearing defining a plurality of holes and having a radial contact surface radially-offset from the outer radial surface of the snubber journal;
    preventing the rotor from contacting respective inner radial surfaces of a plurality of radial magnetic bearings of the rotating machine with a plurality of auxiliary bearings when at least one radial magnetic bearing of the plurality of radial magnetic bearings fails; and
    lubricating the radial contact surface and the outer radial surface of the snubber journal with a first plurality of lubricating plugs, at least one lubricating plug of the first plurality of lubricating plugs is disposed within a respective hole of the plurality of holes of the radial snubber bearing.

14. The method of claim 13, wherein each of the opposing axial snubber bearings defines a plurality of holes therein, and at least one lubricating plug of a second plurality of lubricating plugs is disposed in a respective hole of the plurality of holes of each of the opposing axial snubber bearings, and the method further comprising lubricating at least one of the axial contact surfaces and at least one of the opposing inner axial surfaces during an axial rotor transient overload event with the at least one lubricating plug of the second plurality of lubricating plugs.

\* \* \* \* \*